April 21, 1953
E. A. AGNEW
2,636,129
SOLAR ENGINE
Filed May 8, 1948
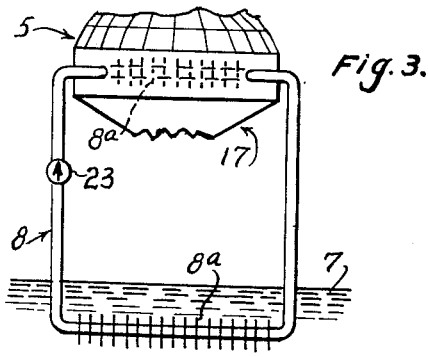
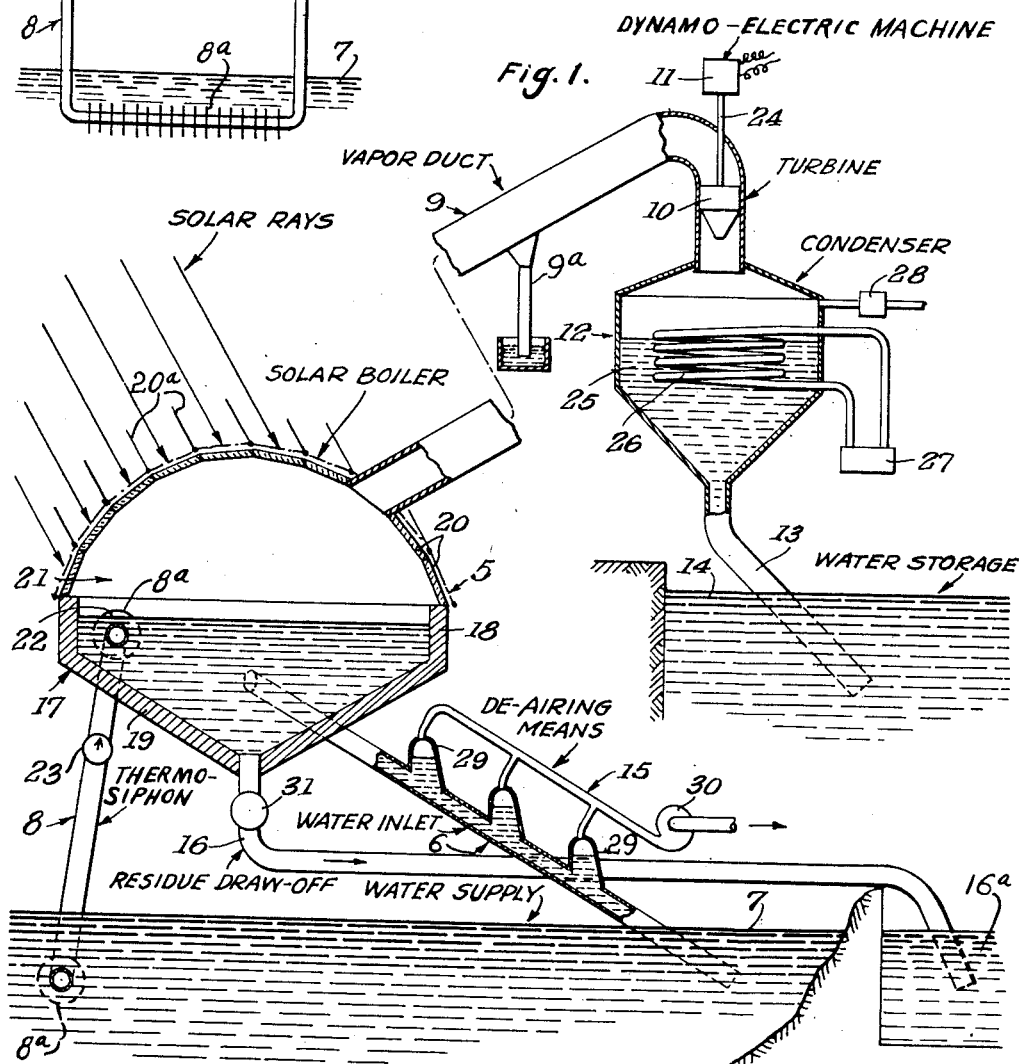
Inventor
EDWARD A. AGNEW
By C. G. Stratton
Attorney Patented Apr. 21, 1953

2,636,129

UNITED STATES PATENT OFFICE 2,636,129

SOLAR ENGINE

Edward A. Agnew, Whittier, Calif.

Application May 8, 1948, Serial No. 25,920

7 Claims. (Cl. 290—2)

This invention relates to apparatus, responsive to the energy of solar rays, for functioning to:
1. Distill sea water to obtain the salt therefrom.
2. Refine and/or distill industrial plant water.
3. Lift water to a higher elevation for use in generating hydro-power.
4. Lift potable water for use at a higher elevation than where stored.
5. Generate electric power with solar energy.
6. Refine and/or distill any liquid that exhibits the typical liquid-vapor cycle.
7. Transport the energy of solar rays as desired.
8. Obtain potable water from sea water or from an unpotable source.
9. Gather and store heat and/or energy for use in the home, in industry, etc.

It is an object of the present invention to provide novel apparatus for accomplishing any and/or all of the foregoing phenomena.

Another object of the invention is to provide improved apparatus that utilizes the energy of solar rays for effecting a temperature differential between a quantity of water or other liquid and the atmosphere thereabove, to conduct the resultant vapors to a higher level, and to condense said vapors and store the liquid thus provided.

Another object of the invention is to provide apparatus as indicated wherein the vapors create power to generate electric current.

A further object of the invention is to provide such apparatus whereby, also, a heat exchange is effected between a source of water supply and a quantity of said water obtained from the supply to increase vaporization of said quantity of water.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a semi-schematic sectional view of apparatus including features of the present invention.

Fig. 2 is an enlarged sectional view of float-valve-controlled means employed in the apparatus.

Fig. 3 is a side view, to a reduced scale, as seen from the left of Fig. 1.

The solar engine that is illustrated comprises, generally, a solar boiler 5, a water inlet and differential-pressure conduit 6 to said boiler from a reservoir or water supply 7, a thermo-siphon exchanger 8 extending from the reservoir 7 into the solar boiler, a duct 9 for vapors generated in the solar boiler and for conducting said vapor to a high level and a remote point, turbo-electric means comprising a turbine 10 that is operated by the vapors moving in duct 9 and a dynamo-electric machine 11 operatively connected thereto, a condenser 12 for condensing said vapors, a differential-pressure conduit comprising a discharge 13 from the condenser to a water storage 14, means 15 for de-airing the water moving in the inlet 6, and a residue draw-off 16 for the solar boiler 5.

The solar boiler 5 is located at a sufficient height above reservoir 7 so that inlet 6 may comprise a differential-pressure conduit under conditions of minimum capacity of the reservoir. Said boiler, when serving as a still for salt water, will have such a capacity that the surface of the water therein will approximate 50,000 square feet or approximately one acre. Accordingly, the boiler will comprise a hopper-like basin 17 constructed of reinforced concrete and supported at the proper height by structural columns or piers (not shown). The basin 17 is preferably of circular form, the upper portion 18 thereof being cylindrical and the lower portion 19 conical with its apex at the draw-off 16. The cylindrical portion 18 is formed of such a height as to accord with any variations in level of the reservoir 7 to maintain the surface of the water in the boiler above the upper end of inlet 6.

The basin 17 is completely covered or roofed by a plurality of glass panels 20 arranged in spherically domed form to enclose a vaporizing chamber 21 above the level 22 of water in basin 17. The panels 20 are mounted in a suitable structural frame with compressible seats or gaskets to accommodate expansion. The outwardly facing surfaces of the glass panels may be coated to increase the transmission therethrough of the entire range of frequencies of solar rays. Certain nitrides have proven effective for this purpose. The above-described boiler is constructed to be air-tight, the construction contemplating suitable seals around panels 20 and between the dome and the basin to effect the same.

The relatively large surface of water 22 will be subjected to the heat and energy in the solar rays passing through the coated panels 20 to cause vaporizing of said water. As will hereinafter be indicated, the chamber 21 is subjected to pressure that is less than atmospheric.

The water inlet or differential-pressure leg 6 is preferably disposed at an angle to permit the incorporation therein of the de-airing means 15. Said leg extends from within the reservoir 7 upwardly to the basin 17 and connects into the latter at a tangent to promote a mild circulation in the boiler. It is evident that upon rarefication of the atmosphere in chamber 21 resulting from the heat of the solar rays, water from the reservoir will pass up in inlet 6 to fill basin 17 according to the differential of pressures on the water in the reservoir and in the basin.

The thermo-siphon 8 is provided for supplementing the vaporizing power of the solar rays. Said thermo-siphon is of the gravity flow type of sufficient capacity for establishing and maintaining a minimum continuous operation. Said thermo-siphon comprises a closed system of ducts that is filled with liquid which, because of a check valve 23 in one leg of the same, sets up a flow of said liquid in one direction only at a rate commensurate with the temperature differential of the water in the reservoir 7 and the water in the solar boiler. When the water in reservoir is of higher temperature than that of the water in the boiler, as during night time operation, the water in the boiler will be warmed by an exchange of heat with the liquid flowing in the thermo-siphon. Since check valve 23 closes to downward flow in siphon 8 and opens only to upward flow, the circulation of liquid in the siphon is always in one direction, said circulation being induced by the mentioned temperature differential between water source 7 and boiler 5.

The duct 9 extends from the boiler 5, and more specifically from the domed roof thereof, at an upward angle. Said duct is shown broken and offset to indicate an indeterminate length of the duct and elevation of the upper end thereof. Because of the large area of the boiling water surface 22 and the relatively smaller cross-sectional area of the duct, an hydraulic advantage results to cause acceleration of vapor rising from said surface and moving in the duct. The acceleration would be a function of the ratio of surface 22 to the cross-sectional area of the duct. Thus, the vapors move in duct 9 at a high rate of speed.

Some heat loss in the vapors, resulting in condensate forming in the duct, may result. Accordingly, suitable liquid traps 9a may be provided for removing such condensates. For long transmissions, the duct may be suitably heat insulated for improved efficiency.

The turbine 10 of the turbo-electric means is positions either in the upper end of duct 9 or otherwise suitably to receive and be operated by the fast moving vapors seeking egress from the duct. The turbine may be of velocity type which, through the medium of a connecting shaft 24, operates the dynamo-electric machine 11 as a generator. The latter, typically, generates electric current for storage and/or transmission, as desired.

After operating the turbine, the vapors will pass into condenser 12 to be condensed into a liquid that is collected at 25 and expressed through discharge leg 13 into storage 14. It is evident that said liquid is free of any, except the most microscopic, of the solids or bacteria present in the liquid taken from reservoir 7. If salt water is initially used, potable water in storage 14 will result.

Condensing of the vapors in condenser 12 is induced by means such as a cooling coil 26 through which a pump 27 circulates a cooling medium. Free air in the vapors, entering the condenser, may be removed by a scavenging pump 28 to obviate the formation of an air pocket that may counter to the movement of vapors into the condenser. In the main, the condenser, in design and capacity, may follow and include conventional and accepted features of condenser design. The alkalinity-acidity constant of the water collected in storage 14 may be expresed by a pH of 9 and its hardness by zero.

In practice, the level of the water storage 14 is elevated with respect to the level of reservoir 7. It is evident, therefore, that valuable power may be generated by returning the stored water to its original level or other intermediate levels.

The de-airing means 15 is provided for removing a large proportion of any free air or gas there may be in the water passing upwardly in conduit 6. A plurality of inverted bells or domes 29 in said leg are arranged to progressively trap out more and more free gases, the same to be then drawn off by a suction pump 30. Each dome 29, as shown in Fig. 2, may embody suitable float valves 29a that control the liquid level therein and thereby prevent liquid from passing off through the de-airing means.

It will be evident that evaporation in the boiler will result in an increasingly larger proportion of solids in the water therein. Said solids, in the form of residue, can be drawn off, from time to time, through draw-off line 16 by opening the valve 31 in said line. This residue contains many valuable by-products that may be refined and/or separated as desired. The line 16 may also comprise a differential-pressure conduit entering into a vessel 16a that receives the residue.

The operation of the solar engine above described is as follows:

Valve 31 is closed and the turbine 10 set into operation by the dynamo-electric machine 11 operating as a motor to cause partial exhaustion of the air in solar boiler 5. By atmospheric pressure, water from reservoir 7 will rise in conduit 6 and enter basin 17. At the same time pump or pumps 28 will be started to exhaust the air received in condenser 12. Thereafter, the pump 28 is controlled automatically to maintain the liquid levels in the boiler and condenser. Pump 30 is set into operation when flow conditions are obtained.

Under the influence of the energy in the solar rays and/or the exchange of heat imparted by the thermo-siphon 8, vaporization of the liquid in the boiler will start as hastened by the rarefied atmosphere in chamber 21. At this time cold water circulation is started in condenser coil 26.

As the rising vapor extracts heat from the boiler, the temperature of the water therein will drop. This temperature drop, in turn, will start circulation of the liquid in the thermo-siphon 8. This flow, in turn, will extract heat from reservoir 7. There is, therefore, set up two flows of heat—one from the reservoir to the boiler and another by solar radiation through the glass roof 20. This heat will be transferred from the water in the boiler to the vapor therein and expressed in the amount described as the heat of evaporation of the liquid.

The heated vapors will then pass, at an accelerated rate, through duct 9 to operate turbine 10 and drive motor generator 11 as a generator.

The condenser 12 will then condense the vapors and absorb the heat remaining therein.

If salt water is the initial liquid drawn into the boiler, after a period of time, the percentage of salt and other solids will approach a density high enough to warrant drawing the same off through line 16. This may be accomplished without interrupting the process of evaporation.

The following two examples of the expected operation of the solar engine will show its ability to perform the objects of the invention:

|  | Operation at 10 a. m. | at Night |
| --- | --- | --- |
| Temperature of Sea Water_____°F__ | 75 | 65 |
| Internal Temperature of Boiler_____°F__ | 127 | 60 |
| Vacuum in Boiler_____inches Hg__ | 28.5 | 29.75 |
| Vaporization Rate per sq. ft._____H. P__ | .215 | .05 |
| Condenser Temperature_____°F__ | 80 | 50 |
| Liquid Transferred_____lbs./H. P__ | 16 | 20 |
| Turbine Efficiency_____percent__ | 97 | 90 |

Such variations in the above figures that may occur can only reflect on the efficiency of the engine rather than on its mode of operation. It is assumed, however, that the ratio of night-to-day operation will not exceed four to one.

The apparatus herein described may be operated to provide a refrigerating medium for many uses. For such uses the apparatus may be smaller in size than herein indicated. By either covering the panels 20 during sunlight as by movable vanes 20a, or operating the engine during the night, and employing the dynamo-electric machine as a motor to create suction in duct 9 and vacuum in chamber 21, rapid vaporization of water in the boiler, resulting in considerable reduction in the temperature of said water, results. Said low temperature water can then be used to cool the water in reservoir 7 which may then be used for refrigerating purposes. To increase this cooling effect between the water in the boiler and in reservoir 7, the thermo-siphon 8 may be provided with fins 8a to facilitate heat exchange between the water in the thermo-siphon 8 and the water in the reservoir 7.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a solar engine, a reservoir, a basin for receiving liquid from the reservoir, a differential pressure conduit extending from the reservoir to the basin for passing liquid into the latter, means in said conduit for removing free air in the liquid passing therethrough, a transparent dome for the basin and comprising a plurality of flat sheets for transmitting solar rays to evaporate the liquid in the basin, an upwardly directed duct extending from said dome to conduct the evaporated liquid to a level above and at a substantially lower atmospheric pressure than that of both the reservoir and the basin, a condenser at the upper end of the duct to condense said vapors, means for removing free air from the condenser, a storage reservoir elevated above the first-mentioned reservoir, and a differential pressure conduit leading from the condenser to the storage reservoir.

2. In a solar engine, a reservoir, a basin for receiving liquid from the reservoir, a differential pressure conduit extending from the reservoir to the basin for passing liquid into the latter, a transparent dome for the basin and comprising a plurality of flat sheets for transmitting solar rays to evaporate the liquid in the basin, a closed-circuit thermo-siphon heat exchanger extending from the reservoir and into the liquid in the basin for increasing the evaporative rate of said liquid, an upwardly directed duct extending from said dome to conduct the evaporated liquid to a level above and at a substantially lower atmospheric pressure than that of both the reservoir and the basin, a condenser at the upper end of the duct to condense said vapors, means for removing free air from the condenser, a storage reservoir elevated above the first-mentioned reservoir, and a differential pressure conduit leading from the condenser to the storage reservoir.

3. In a solar engine, a reservoir, a basin for receiving liquid from the reservoir, a differential-pressure conduit extending from the reservoir to the basin for passing liquid into the latter, a transparent dome for the basin and comprising a plurality of flat sheets for transmitting solar rays to evaporate the liquid in the basin, a duct extending upwardly from said dome to receive vapors generated in the basin and conduct them to a relatively elevated level, the cross-sectional area of said duct being considerably smaller than the surface area of the liquid in the basin whereby the vapors move upward in the duct at an accelerated speed, a condenser at the upper end of the duct for condensing the vapors entering the same, turbo-electric means in the duct and on the inlet side of the condenser and operated by the vapors moving toward the latter, means to remove free air from the condenser, a storage reservoir elevated above and under a lower pressure than the pressure on the first-mentioned reservoir, and a differential conduit extending between the condenser and said storage reservoir.

4. In a solar engine, a reservoir, a basin for receiving liquid from the reservoir, a differential-pressure conduit extending from the reservoir to the basin for passing liquid into the latter, a transparent dome for the basin and comprising a plurality of flat sheets for transmitting solar rays to evaporate the liquid in the basin, a duct extending upwardly from said dome to receive vapors generated in the basin and conduct them to a relatively elevated level, the cross-sectional area of said duct being considerably smaller than the surface area of the liquid in the basin whereby the vapors move upward in the duct at an accelerated speed, a condenser at the upper end of the duct for condensing the vapors entering the same, turbo-electric means in the duct and on the inlet side of the condenser and operated by the vapors moving toward the latter, said turbo-electric means comprising a turbine within the duct and a dynamo-electric machine operatively connected therewith, means to remove free air from the condenser, a storage reservoir elevated above and under a lower pressure than the pressure on the first-mentioned reservoir, and a differential conduit extending between the condenser and said storage reservoir.

5. In a solar engine, a reservoir, a basin for receiving liquid from the reservoir, a differential-pressure conduit extending from the reservoir to the basin for passing liquid into the latter, a transparent dome for the basin and comprising a plurality of flat sheets for transmitting solar rays to evaporate the liquid in the basin, a duct extending upwardly from said dome to receive vapors generated in the basin and conduct them to a relatively elevated level, the cross-sectional area of said duct being considerably smaller than the surface area of the liquid in the basin whereby the vapors move upward in the duct at an accelerated speed, a condenser at the upper end of the duct for condensing the vapors entering the same, turbo-electric means in the duct and on the inlet side of the condenser and operated by the vapors moving toward the latter, said turbo-electric means comprising a turbine within the duct and a dynamo-electric machine operatively connected therewith, said machine being adapted to be operated as a motor to drive the turbine to evacuate, through the duct, the atmosphere above the basin and within the dome and thereby hasten the evaporative rate of the liquid in the basin, means to remove free air from the condenser, a storage reservoir elevated above and under a lower pressure than the pressure on the first-mentioned reservoir, and a differential conduit extending between the condenser and said storage reservoir.

6. A solar engine comprising, in combination, a water supply, a solar boiler positioned above said supply and having a water-holding basin wherein water may be evaporated by solar rays striking the boiler, a differential pressure conduit extending from the water supply to the basin for passing water from the former to the latter, a duct extending upwardly from the boiler to conduct water vapor from the boiler to a level substantially above the water supply and the boiler, a vapor condenser at the upper end of said duct to receive and condense the water vapors entering therein, means for removing free air from the condenser, a storage reservoir below the condenser and elevated substantially above the level of the water supply and at a lower atmospheric pressure than said water supply, and a differential pressure conduit leading from the condenser to said reservoir.

7. A solar engine according to claim 6: turbo-electric means in the duct and on the inlet side of the condenser and operated by the vapors moving toward the latter.

EDWARD A. AGNEW.

References Cited in the file of this patent

UNITED STATES PATENTS

| Number | Name | Date |
|---|---|---|
| 983,424 | Brosius | Feb. 11, 1911 |
| 995,219 | Bradley | June 13, 1911 |
| 1,101,000 | Willsie | June 23, 1914 |
| 1,544,029 | Nelson | June 30, 1925 |
| 2,030,350 | Bremser | Feb. 11, 1936 |
| 2,167,576 | Kiser | July 25, 1939 |
| 2,200,138 | Von Sauer | May 7, 1940 |
| 2,213,894 | Barry | Sept. 3, 1940 |
| 2,372,846 | Nettel et al. | Apr. 3, 1945 |
| 2,424,142 | Bimpson et al. | July 15, 1947 |

FOREIGN PATENTS

| Number | Country | Date |
|---|---|---|
| 11,511 | Australia | May 18, 1908 |
| 28,130 | Great Britain | of 1907 |
| 763,867 | France | Feb. 19, 1934 |

OTHER REFERENCES

Scientific American, February 1930, pages 144 and 145.